Oct. 23, 1951 M. SKLOVSKY ET AL 2,572,399
GARDEN TRACTOR
Filed May 13, 1946 3 Sheets-Sheet 1

INVENTOR.
Max Sklovsky
Ira D. Maxon
BY Morris Spector,
Attorney

Oct. 23, 1951     M. SKLOVSKY ET AL     2,572,399
GARDEN TRACTOR
Filed May 13, 1946     3 Sheets-Sheet 2
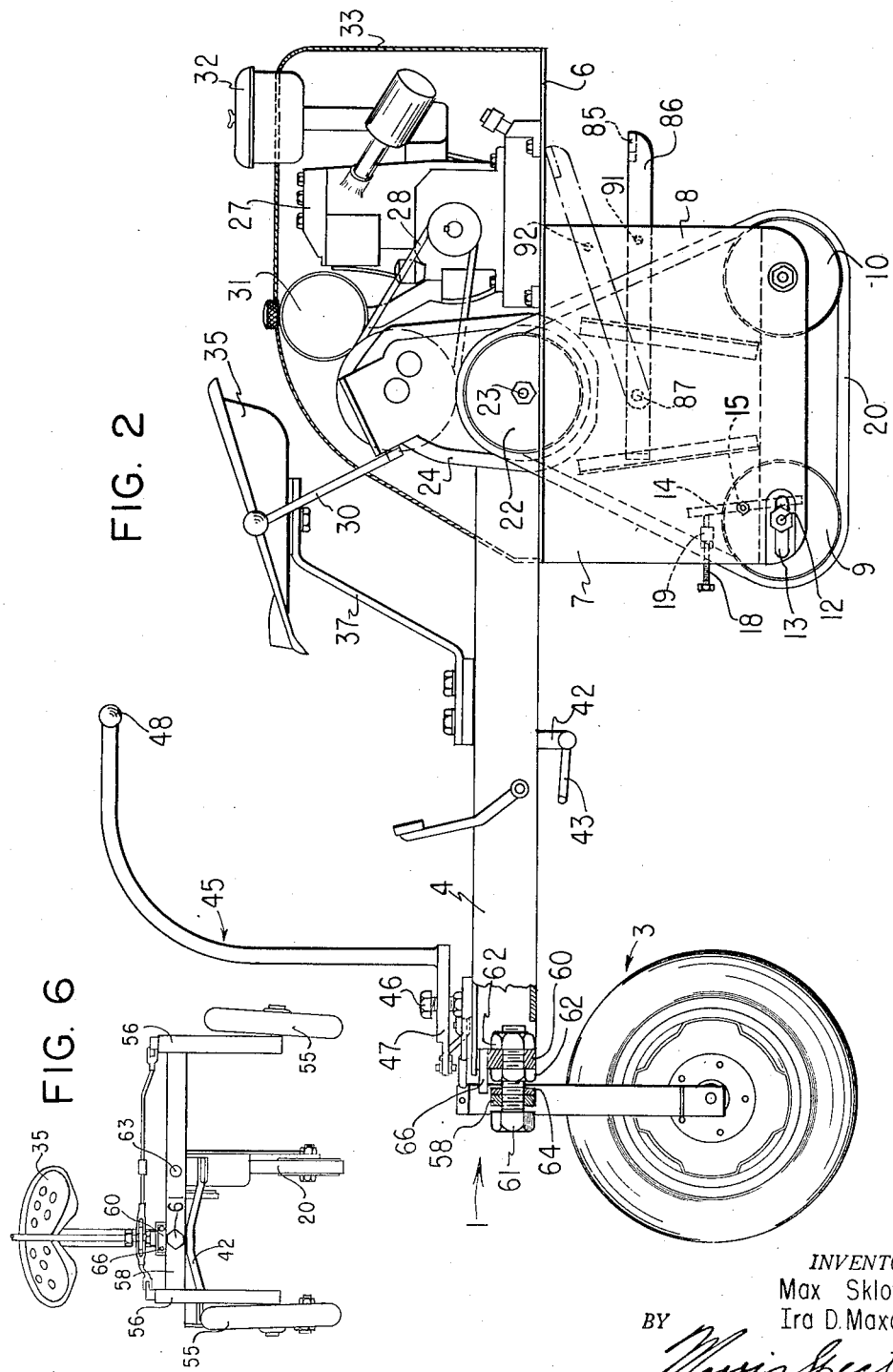
INVENTOR.
Max Sklovsky
Ira D. Maxon
BY
Attorney Oct. 23, 1951  M. SKLOVSKY ET AL  2,572,399
GARDEN TRACTOR
Filed May 13, 1946  3 Sheets-Sheet 3
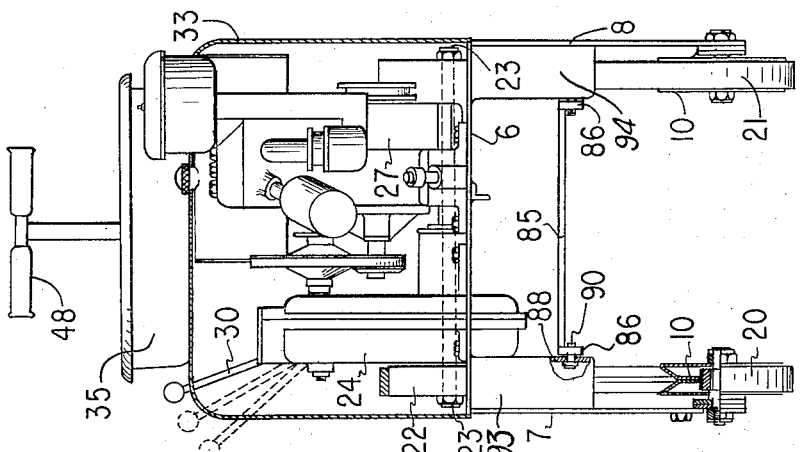
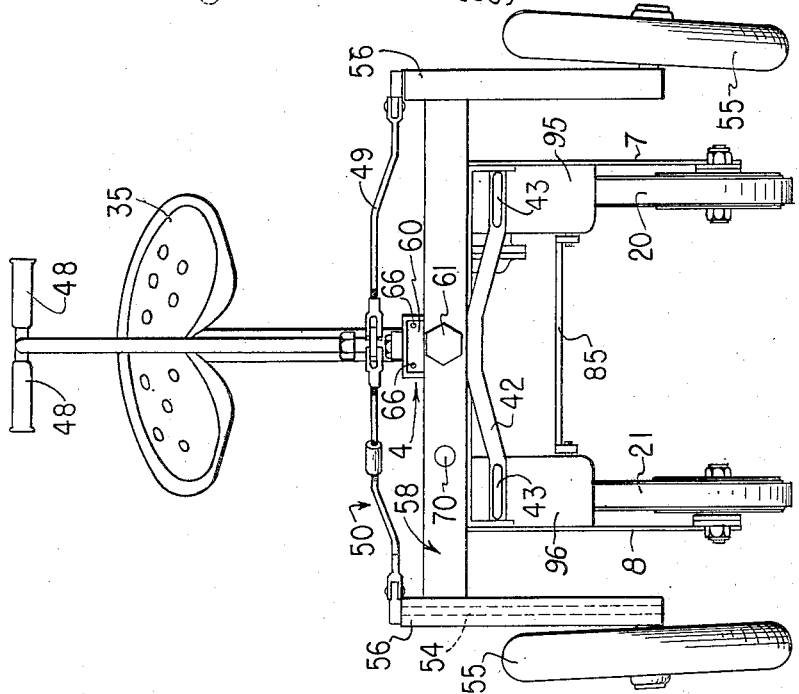
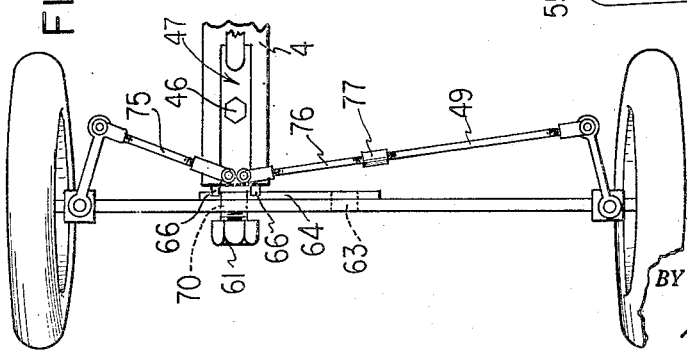
INVENTOR.
Max Sklovsky
Ira D. Maxon
BY Morris Spector
Attorney Patented Oct. 23, 1951

2,572,399

UNITED STATES PATENT OFFICE 2,572,399

GARDEN TRACTOR

Max Sklovsky, Moline, and Ira D. Maxon, Highland Park, Ill.

Application May 13, 1946, Serial No. 669,308

12 Claims. (Cl. 180—9.1)

This invention relates to tractors, particularly agricultural tractors, and is particularly concerned with the production of a tractor of the type that is adapted for use on very small farms, such as, for instance, truck farms.

It is one of the objects of the present invention to provide a tractor which shall be small in size, light in weight, economical of construction and easily adaptable for a wide variety of uses and agricultural operations.

It is a further object of the present invention to provide a tractor the main body of which is sufficiently elevated from the ground to enable it to clear small plants, and yet which does not require large or heavy driving wheels nor the usual types of drop axles for accomplishing the same result. In order to accomplish this result the rear ground-engaging driving means, which usually consist of the large wheels, are replaced by crawler tracks, which provide a ground-engaging area sufficient for the requisite traction effort and which are arranged to be driven from adjacent the upper portion of the endless loop comprising the track. In order to provide an economical and light weight structure and one capable of turning on a small radius the driving tracks are of a length which is only a small fraction of the total length of the tractor. Also, the driving tracks are placed sufficiently close together so that when the tractor travels around a curve the difference in the arcs of travel of the two tracks is sufficiently small to enable the use of a direct drive to the two tracks without the intermediary of a differential or the like. The spacing between the two tracks of the tractor is made so small that it is only sufficient to enable straddling of a single row of plants. In order to give the requisite stability to the tractor the front or steering wheels thereof are spaced apart a much greater distance, namely, a distance of the order of twice the spacing between the crawler tracks.

The front axle which carries the steering wheels is arranged so that it can be connected to the body of the tractor in either of two positions. In one position it is connected to the body of the tractor centrally of the front axle and in the alternate position of the front axle it is shifted so that one of the two front wheels is in line with one of the rear treads.

It is a still further object of the present invention to provide an improved an simple manner of connecting the front axle to the body of the tractor in such a manner that the front axle and its associated tie rods may be easily and quickly shifted from one position to an alternate position with respect to the body of the tractor and without requiring different numbers of tractor parts for the different positions.

It is a still further object of the present invention to provide a tractor of the above mentioned character in which the crawler track supporting pulleys are supported from the frame of the tractor in a very simple and economical manner. This is accomplished in one preferred embodiment of the present invention, by mounting the engine on a elevated platform rearwardly of the seat of the driver which platform has, on opposite lateral sides thereof, downwardly projecting flanges each of which acts as a support for two longitudinally spaced bottom pulleys. An additional pulley is mounted at or near the top of each of the lateral flanges and constitutes the driving pulley. A power transmission belt is wrapped around the set of pulleys on each side of the tractor. The belt may be a V-belt of the side power transmitting type so that the sides of the belt engage angularly disposed circular flanges on the respective pulleys, as is usual in the transmission of power by means of V-belts of the side drive type. The position of one of the pulleys is preferably adjustable to take up slack in the belt. In the preferred arrangement the adjustable pulley is placed at the front or slack side of the belt.

The attainment of the above and further objects of the present invention will be apparent from the following specification taken in conjunction with the accompanying drawings forming a part thereof.

In the drawings:

Figure 2 is a side view of the tractor of Figure 1, with the hood and certain other parts in section for illustrative purposes;

Figure 3 is a rear view of the motor unit of the tractor, in partial section;

Figure 4 is a front view of the tractor;

Figure 5 is a fragmentary top view illustrating the front wheels in an alternate position from that illustrated in Figure 1; and Figure 6 is a front view of the tractor with the front supporting wheels in the position illustrated in Figure 5.

Reference may now be had more particularly to the drawings wherein like reference numerals designate like parts throughout.

Figure 1:
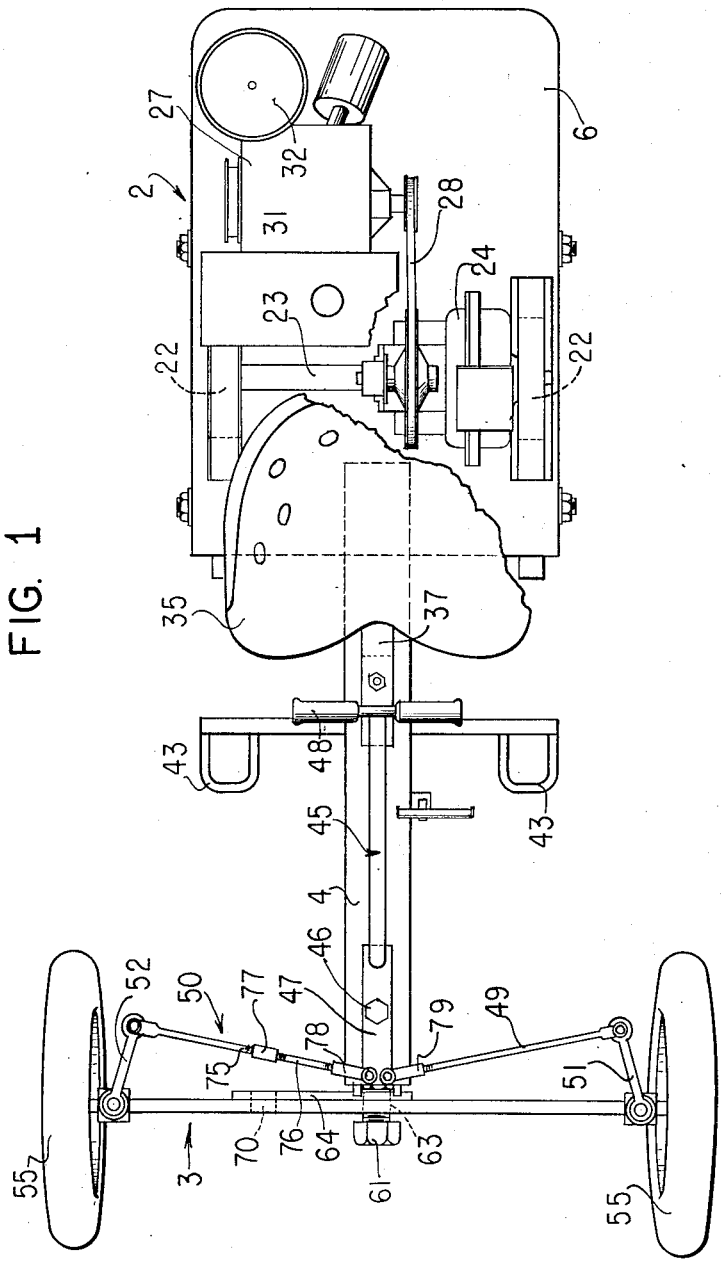
Figure 1 is a top view of a tractor embodying the present invention, with the hood removed and certain parts broken away.

The tractor of the present invention, indicated in general by the reference numeral 1, consists of a rear power unit 2 supported by traction means, to be more fully described, and front steering means 3 connected together by a tongue 4 the rear end of which is welded or otherwise rigidly secured to the rear power unit, and the front of which is connected to the steering means 3 at either one of two locations on the steering means, as will be more fully set forth as this description proceeds.

The rear power unit comprises a platform 6, preferably of sheet metal, to the opposite lateral sides of which are welded or otherwise suitably secured a pair of downwardly extending plates 7—8 which constitute depending flanges at the opposite lateral sides of the platform. A pair of pulleys 9—10 are rotatably mounted on each of the plates 7—8 at the bottom thereof. The pulleys 9 and 10 on each plate are in line with one another, and one of the pulleys, preferably the forward one 9, is mounted so as to permit adjustment thereof in a direction towards and away from the other pulley. This result is obtained by locating the pulley axle 12 in a horizontal take-up slot 13 and providing a lever 14 pivoted at 15 to the downwardly extending plate and bearing at its lower end against the pulley axle 12. The position of the upper end of the lever 14 is adjustably fixed by an adjusting screw 18 that threads through a lug 19 fixed to the inner surface of the plate 7. Crawler type ground-engaging traction means 20—21 is provided. Each traction means is an endless belt wrapped around the pulleys 9 and 10 of the plate and around a driving pulley 22. Each belt 20—21 may be of the type that is used industrially in the transmission of power from one pulley to another and may be of the flat type, or may be of the V type wherein the engagement between the pulley and the belt is along the inclined sides of the belt. The pulleys 22 are both keyed on a drive shaft 23 so that the two pulleys on opposite sides of the power unit are keyed together. The drive shaft 23 extends through and is driven from a speed reducing gear case 24 that is mounted on the platform 6 and is driven by an internal combustion engine 27 which is also mounted on the platform 6 and which is connected to the gear case by a driving belt 28. The gear case 24 houses a variable speed transmission the gear ratio being controlled by a gear shift lever 30 in the usual manner. The engine 27 and gear transmission 24 constitute a power plant mounted on the platform 6. The power plant includes a fuel tank 31 and an air filter 32 both of which are accessible through a removable hood 33, as may be seen from Figures 2 and 3.

The ground-engaging driving tracks are preferably made as close to one another as possible consistent with a wide range of use of the tractor. For this purpose it has been found that a distance of nineteen inches from center to center of the belts 20—21 is suitable. This distance is sufficiently large to permit the belts 20—21 to come on opposite sides of young growing plants so that the tractor can straddle the plants, and yet they are sufficiently close together so as to permit the elimination of a differential between the driving means for the two belts 20—21. This is due to the fact that the difference in length of travel of the two belts in moving around a curve is so small that the slippage which takes place due to the direct driving connection between the two belts is of minor consequence.

During cultivation with the tractor of the present invention the rear traction means 20 can be driven very close to the rows of crops next to those that are being straddled. This is so because the depending flanges 7—8 are effective to keep the overhanging foliage of plants in those rows from becoming entangled with the moving belts. The fact that these flanges are continuous and windowless serves to keep such overhanging foliage that may be waving in the wind from entering into the paths of the moving belts as the tractor advances.

The tongue 4 preferably consists of a rectangular or square metal tube. The rear of the tube is welded or otherwise suitably secured to the top of the platform 6. A usual type of tractor seat 35 is mounted on the tongue 4 in any desired manner, as by means of a spring strap 27 which is bolted to the tongue 4. The handle of the gear shift lever 30 terminates adjacent to the seat 35 to be readily accessible to the driver of the tractor. A foot rest 42 which consists of an arched metal bar is welded at its center to the bottom of the tongue 4 and extending transversely of the tractor and downwardly from the center and terminates in foot receiving supports 43—43 that are below the bottom of the tongue and in line with the crawler treads or belts 20—21. As a result a driver sitting on the seat 35 with his feet in the foot rests 43—43 may be straddling a row of plants on opposite sides of which the traction belts 20—21 are moving.

A steering column 45 is pivoted about a vertical axis 46 at the front of the tongue. To that effect the steering column has a steering plate 47 welded thereto. The plate is pivoted to swing about the vertical pivot axis 46.

The top of the steering column 45 terminates in handle bars 48—48 adjacent the driver in the seat 35. Movement of the handle bars to the right or to the left results in turning of the steering plate 47 about the pivot 46. Tie rods 49—50 are pivoted at one end to the steering plate 45 and at the opposite ends are pivoted to cranks 51—52 at the upper ends of king pins 54 that carry the front steering wheels 55—55 and are themselves journalled in sleeves 56—56 that extend vertically downwardly from and are welded to a front steering frame 58.

The front steering frame extends across the front of the tongue 4 and is pivotally connected thereto to support the tongue. To facilitate mounting of the front steering means 3 and the tongue 4 a plate 60 is welded across the front of the tongue. The plate has an opening therethrough to receive the shank of a bolt 61 which is locked in place in any desired manner, as by a pair of lock nuts 62—62 that are threaded on the shank of the bolt and tightened against the plate 60. The shank of the bolt 61 threads through a threaded hole 63 located centrally in the front steering frame 58. The front of the tongue 4 thus rests on the front steering frame 58 through the threads on the shank of the bolt 61. In order to increase the bearing area between the shank of the bolt 61 and the frame 58 a plate 64 is welded to the rear surface of the frame 58, the threaded hole in the plate 58 continuing on through the plate 64. It is thus apparent that the front steering means 3 is free to swing about a horizontal axis coincident with the center of the bolt 61. This is provided in order to permit a limited amount of swinging of the front steering means to compensate for unevenness in the ground, and permits both steering wheels to remain in engagement with the ground even if either one of the wheels is in a furrow or if one of the wheels is passing over an obstruction or the like. A pair of stop pins 66—66 project outwardly from the plate 60 above the steering frame 58 on opposite sides of the center of the bolt 61 to limit the extent of swinging of the front steering frame.

It is sometimes desirable to shift the position of the front steering means so that one of the front steering wheels 55—55 is in line with one of the ground-engaging traction means 20—21. To facilitate this the front steering frame 58 is provided with a threaded hole 70, similar to the threaded hole 63. The tie rod sets 49—50 are disconnected from the steering plate 45, the bolt 61 is loosened, removed from the tongue 4 and from the hole 63 of the supporting frame and threaded through the hole 70 and then again passed through the plate 60 of the tongue 4 and locked in place. The tie rods are then reassembled. For this purpose the tie rod 50 consists of two rods 75—76 connected by a threaded nipple 77. The rod 76 is unthreaded from a clevis 78 and the rod 75 is threaded into that clevis. The rod 49 is unthreaded from a clevis 79 and one end of the rod 76 is threaded into the clevis 79. The nipple 77 at the opposite end of the rod 76 is then threaded to connect the rod 76 with the rod 49, as illustrated in Figures 5 and 6. When this is done the location of the front steering frame is as illustrated in Figures 5 and 6. The arrangement is such that the tie rod 49 is lengthened by exactly the same amount that the tie rod 50 is shortened, so that in making the change over no additional parts are required and no parts previously used are left over perhaps to get lost. The front axle adjustment is of considerable importance in various agricultural operations involving use of the tractor.

To facilitate the use of the tractor a draw bar 85 extends across the rear of the power unit, said draw bar being secured to two levers 86—86 that are pivoted at 87 to plates 88 that are welded to the bottom of the platform 6 and extend downwardly therefrom inwardly of the plates 7 and 8. In order to hold the draw bar 85 either in its lowered position, illustrated in Figure 2, or in an elevated alternate position a pair of pins 90 are passed through each of the levers 86 and into one or another of two holes 91—92 in the plates 88.

A pair of rear guard plates 93—94 are mounted at the inner sides of the plates 7 and 8 at the rear thereof and a pair of similar guard plates 95—96 are similarly mounted adjacent the top of the plates 7 and 8 at the forward part of those plates. The guard plates 93—94 are rearward of the top of the belts 20—21 and the guard plates 95—96 are forward of the belts 20—21, as may be seen from Figures 3 and 4. These guard plates together with the plate 88 serve to guard plants against injury by pieces of soil that may be thrown outwardly of the belts as the belts advance to a position around the driving pulleys 22.

The weight distribution of the tractor is such that substantially all of the weight of the power unit is on the belts, which constitute the traction means. This, of course, increases the tractive power of the machine. The downward force of the forward end of the tongue 4 acting on the front steering wheels when the seat 35 is not occupied is very small. This greatly facilitates the ease with which the front steering means may be attached to the tongue 4 in its alternate positions. When an occupant sits on the seat 35 of the tractor a certain portion of the weight of the occupant is transmitted through the tongue 4 to the front steering wheels, which increases the downward pressure of the tongue on the steering wheels and thus increases the effectiveness of the steering arrangement.

The arrangement of the steering column 45 is such that the steering column does not interfere with visibility during cultivation.

During plowing both crawler tracks can travel on the unplowed ground. This improves traction as compared with having one crawler track in a furrow. Furthermore, since both crawler tracks are on the unplowed ground they are both on the same level, as distinguished from an arrangement wherein one crawler track is in a furrow and therefore below the other track and resulting tilting of the tractor. During plowing one of the two steering wheels can be in a furrow still retaining the leveling feature of the tractor. This is due to the fact that even though the front steering frame is not level the pivoting arrangement between that frame and the tongue 4 of the tractor at the bolt 61 permits the tractor to remain level. The fact that the tractor remains level during plowing is of great importance because as a result of this arrangement it becomes unnecessary to change the angle of the plow in relation to the tractor with changes in plowing depths. In view of the fact that the tractor can remain level from side to side during plowing it follows that both traction tracks are in effective contact with the ground, resulting in a better traction for the same weight or permitting a lower weight tractor construction for the same tractive effort.

In compliance with the requirements of the patent statutes we have here shown and described a preferred embodiment of our invention. It is, however, to be understood that the invention is not limited to the precise construction here shown, the same being merely illustrative of the principles of the invention. What we consider new and desire to secure by Letters Patent is:

1. A tractor having a rear unit comprising a platform, power transmitting means thereon, and crawler type ground-engaging traction means supporting the platform and coupled to the power transmitting means, a tongue of a width substantially less than that of the unit secured to and extending forward of the unit, and a pair of front steering wheels supporting the forward end of the tongue, the center of the power transmitting means on the platform being located rearwardly of the foremost ground-engaging part of the crawler type traction means whereby the front steering wheels that support the forward end of the tongue support substantially none of the weight of the power transmitting means.

2. An agricultural tractor having a rear unit comprising a platform, a power transmission on the platform, and crawler type ground-engaging traction means supporting the platform and coupled to the transmission, a tongue of a width substantially less than that of the platform secured to and extending forward of the platform, a front steering frame including a transverse member extending across the front of the tongue and secured thereto, a pair of steering wheels secured to and supporting the frame, the center of the power transmitting means on the platform being located rearwardly of the foremost ground-engaging part of the crawler type traction means whereby the front steering wheels that support the forward end of the tongue support substantially none of the weight of the power transmitting means, and a driver's seat only a portion of which is forward of the foremost of the ground-engaging part of the traction means whereby at least a portion of the weight of the driver is carried by the front steering wheels.

3. An agricultural tractor having a rear power unit comprising an elevated platform, a power plant on the platform, and crawler type ground-engaging traction means supporting the platform and coupled to the power plant, a tongue of a width substantially less than that of the power unit secured to and extending forward of the power unit, and a front steering frame including a transverse member extending across the front of the tongue and pivoted thereto for freedom of swinging about an axis extending longitudinally of the tongue, and a pair of ground-engaging steering wheels secured to and supporting the frame, the center of the power transmitting means on the platform being located rearwardly of the foremost ground-engaging part of the crawler type traction means whereby the front steering wheels that support the forward end of the tongue support substantially none of the weight of the power transmitting means.

4. An agricultural tractor having a body which includes an elevated platform and two pendant lateral sides spaced apart an amount sufficient to clear row crop plants with the horizontal platform spaced above the ground to permit vertical clearance of the same plants, each of said pendant sides being a continuous windowless member and said pendant sides together with the platform and together with the ground forming substantially a closed sided tunnel, and ground-engaging traction means on the respective pendant sides, the pendant sides each extending both forward and rearward of the ground-engaging means thereon thereby shielding plants from engaging the moving ground-engaging traction means.

5. An agricultural tractor having a body which includes an elevated platform and two pendant sides spaced apart an amount sufficient to clear row crop plants with the horizontal platform spaced above the ground to permit vertical clearance of the same plants, said pendant sides together with the platform and together with the ground forming substantially a tunnel, crawler type ground-engaging tractions means on the respective pendant sides, driving motor means on the platform, and driving connections between the motor means and the traction means, the center of the driving motor means being located rearwardly of the foremost ground-engaging portions of the traction means whereby the entire weight of the motor means is carried by the traction means.

6. An agricultural tractor having a body which includes an elevated platform and two pendant structures one on each lateral side and spaced apart an amount sufficient to clear row crop plants with the horizontal platform spaced above the ground to permit vertical clearance of the same plants, ground-engaging traction means on the respective pendant structures, driving motor means on the platform, and driving connections between the motor means and the traction means, the center of the driving motor means being located rearwardly of the foremost ground-engaging portions of the traction means whereby the entire weight of the motor means is carried by the traction means, and a tongue extending forward of the platform, and ground-engaging steering means supporting the forward end of the tongue.

7. An agricultural tractor body having a raised platform and pendant closed sides right and left extending downwardly from the platform close to the ground and spaced apart to permit lateral plant clearance of row crops and vertical clearance under the platform, the platform together with the closed sides forming an inverted U and substantially a closed sided moving tunnel over the ground, ground-engaging traction units at the bottom of the sides, a power transmitting shaft means on the platform, and coupling means between the shaft means and the traction units.

8. An agricultural tractor body having a raised platform and pendant closed sides right and left extending downwardly from the platform close to the ground and spaced apart to permit lateral plant clearance of row crops and vertical clearance under the platform, the latter together with the closed sides forming an inverted U and substantially a closed sided moving tunnel over the ground, power transmitting pulleys on the platform the sides having mounted thereon traction belt-engaging units, and an endless ground-engaging traction belt surmounting the pulleys and the traction belt-engaging units on the sides.

9. An agricultural tractor body having a raised platform and pendant closed sides right and left extending downwardly from the platform close to the ground and spaced apart to permit lateral plant clearance of row crops and vertical clearance under the platform, the latter together with the closed sides forming an inverted U and substantially a closed sided moving tunnel over the ground, power transmitting pulleys on the platform the sides having mounted thereon traction belt-engaging units, and an endless ground-engaging traction belt surmounting the pulleys and the traction belt-engaging units on the sides, and a power plant on top of the platform for driving the pulleys, the center of the power plant being substantially rearward of the foremost ground-engaging portion of the traction belt.

10. An agricultural tractor having a body which includes an elevated platform and two closed pendant sides spaced apart an amount sufficient to clear row crop plants with the platform spaced above the ground an amount sufficient to permit vertical clearance of the same plants, ground-engaging traction means on the respective pendant sides, said pendant sides together with the platform forming an inverted closed sided channel moving over the ground with the space between the platform and the ground between the sides free of obstruction to plants, a power transmission on the platform, an engine driving the transmission, driving connections between the transmission and the traction means, and a driver's seat forward of the transmission.

11. An agricultural tractor having a body which includes an elevated platform and two pendant sides spaced apart an amount sufficient to clear row crop plants with the platform spaced above the ground an amount sufficient to permit vertical clearance of the same plants, ground-engaging traction means on the respective pendant sides, said pendant sides together with the platform forming an inverted channel moving over the ground with the space between the platform and the ground between the sides free of obstructions to plants, a power transmission on the platform, an engine driving the transmission, driving connections between the transmission and the traction means, a driver's seat forward of the transmission, a tongue secured to and extending forward of the platform and a forward steering unit supporting and secured to the tongue.

12. A tractor comprising a frame including a rear platform, power transmitting driving pulleys on opposite lateral sides of the platform and coupled together, said platform having a depending flange at each of the opposite lateral sides thereof, pairs of pulleys journalled on the respective flanges adjacent the bottoms thereof with the pulleys of each pair located one adjacent the front of its flange and one located adjacent the rear of its flange, and separate ground-engaging driving belts each wrapped around one pair of pulleys and around one of the driving pulleys, each flange comprising a plate member covering substantially all of that portion of the adjacent ground-engaging driving belt that is above the bottom of the plate member and below the platform.

MAX SKLOVSKY.
IRA D. MAXON.

REFERENCES CITED

The following references are of record in the file of this patent:

UNITED STATES PATENTS

| Number | Name | Date |
|---|---|---|
| 1,112,460 | Leavitt | Oct. 6, 1914 |
| 1,130,363 | Zelle | Mar. 2, 1915 |
| 1,153,537 | Barber | Sept. 14, 1915 |
| 1,273,412 | Salsbury | July 23, 1918 |
| 1,310,772 | Swartz | July 22, 1919 |
| 1,312,159 | Chalmers | Aug. 5, 1919 |
| 1,370,844 | Scanlan | Mar. 8, 1921 |
| 1,430,835 | Nilson | Oct. 3, 1922 |
| 1,533,143 | Ryba | Apr. 14, 1925 |
| 1,566,229 | Scanlan | Dec. 15, 1925 |
| 1,568,665 | Gelly | Jan. 5, 1926 |
| 1,652,049 | Roberts | Dec. 6, 1927 |
| 1,665,559 | Moore | Apr. 10, 1928 |
| 1,682,727 | Jones | Aug. 28, 1928 |
| 1,821,196 | Worley | Sept. 1, 1931 |
| 1,847,249 | Knapp et al. | Mar. 1, 1932 |
| 2,132,069 | Hall | Oct. 4, 1938 |
| 2,300,387 | Lindsay | Oct. 27, 1942 |
| 2,378,615 | Brown | June 19, 1945 |
| 2,413,355 | Johnson | Dec. 31, 1946 |
| 2,416,679 | Curtis | Mar. 4, 1947 |

FOREIGN PATENTS

| Number | Country | Date |
|---|---|---|
| 40,430 | France | June 23, 1932 |
| | (1st addition to No. 724,844) | |
| 763,381 | France | Apr. 30, 1934 |